UNITED STATES PATENT OFFICE 2,520,601

POLYMERIZATION PROMOTERS

Max M. Lee, New York, N. Y.

No Drawing. Application July 3, 1947,
Serial No. 758,996

7 Claims. (Cl. 260—45.4)

This invention relates to a process of making polymerization products and to materials specifically intended to catalyze the polymerization of reactive ethylenic compounds of the vinyl or acrylic type with unsaturated polyester resins. More particularly this invention is concerned with the addition of materials of the class of organic phosphines as catalysts for the polymerization of reactive ethylenic compounds with a polyhydric alcohol ester of an alpha-beta unsaturated aliphatic polycarboxylic acid (hereinafter for brevity designated generally as an "unsaturated alkyd resin").

Present methods of polymerization of ethylenic compounds with unsaturated alkyd resins involve either the external application of heat or the exposure of said solutions to light of short wavelength. Due to the low conductivity of heat, considerable time is necessary to bring the liquid resins to polymerization temperature. When the polymerization does begin the heat of the highly exothermic reaction, coupled with the heat already applied to bring the resin to polymerization temperature, is sufficient to cause many fractures in the polymerized polymer. In thick sections of laminates, the excessive heat which is the result of the combination of applied heat and heat of polymerization very often causes delamination of the layers from each other. The heat attained is very often higher than the boiling point of the monomers when low boiling monomers are present. Under such conditions froth-like masses often result. It is, therefore, desirable to carry out the polymerization at the lowest possible temperature in order to eliminate bubbles and fractures in the polymerized masses. When the proper concentration of organic phosphines is used in conjunction with organic peroxides, the polymerization can be carried out without the application of heat or light of short wave-length. As a result there is less tendency for fracture or bubble formation in the polymerized resin. Also, the tendency of laminates to delaminate is considerably reduced.

An object of this invention is to provide a new series of polymerization accelerators for the polymerization of ethylenic compounds of the vinyl or acrylic type with unsaturated alkyd resins.

Another object of this invention is to provide a process for the polymerization of ethylenic compounds with unsaturated alkyd resins without the external application of heat.

Another object is to reduce the quantity of organic peroxide catalyst necessary to bring about the polymerization reaction since there is a potential danger in handling large quantities of unstable peroxide catalysts.

In copending application 571,013, filed January 1, 1943, now abandoned, there is disclosed a process and a series of catalysts for promoting or accelerating the polymerization of the allyl and unsaturated polyester compounds and mixtures of such compounds with ethylenic compounds. The catalysts employed according to said application were tertiary aromatic amines.

In copending application No. 665,645 filed April 27, 1946 there is disclosed the process of employing certain secondary aromatic amines for the same purpose.

It has now been found that the alkyl and aryl phosphines also have the property of promoting or accelerating the polymerization of the allyl and/or unsaturated polyester type of resin forming compounds and mixtures of such compounds with ethylenic polymerizable materials.

The phosphines which are employed as catalysts according to the present invention, have the general formula:

where R is alkyl or aryl and $R_1$ and $R_2$ are hydrogen or alkyl groups. The aryl group may be phenyl, napthyl, etc. and may or may not be substituted in the ring with an alkyl, hydroxyalkyl, alkoxyalkyl, an amino (primary, secondary, or tertiary) or other organic group.

The alkyl groups may be any known alkyl groups such as methyl, ethyl, propyl, butyl, etc.

Either $R_1$, $R_2$ or $R_1$ and $R_2$ may be hydrogen. Thus the compound can be a primary, secondary or tertiary phosphine.

Examples of primary phosphines which may be employed are phenyl phosphine, monobutyl phosphine, monooctyl phosphine, naphthyl phosphine, etc.

Examples of secondary phosphines which may be employed are, dibutyl phosphines, phenyl methyl phosphine, phenyl octyl phosphine, ethyl phenyl phosphine, etc.

Examples of tertiary phosphines which may be employed are tributyl phosphine, trioctyl phosphine, phenyl dimethyl phosphine, phenyl diethyl phosphine, triethyl phosphine, triamyl phospine, etc.

The concentration of the accelerator that is used in the polymerization process depends upon a number of factors such as the phosphine employed, the constitution of the resin solution, the concentration of the inhibitor present, the concentration of the organic peroxide, and the temperature at which the polymerization reaction is carried out. In general the concentration of the phosphine employed may vary from 0.001% to 10% based on the weight of the resin present. However, I prefer to use concentrations varying from 0.01% to 5% to bring about the polymerization reaction. The accelerating effect is dependent somewhat upon the position of substituent groups in the aryl radical and the position of side chain groups in relation to the phosphorous atom. While it cannot be predicted for every possible substituent and while it is impossible to try every possible compound, it can be stated that substituents in the aryl ring which are positioned ortho relative to the phosphohorous atom should be avoided probably because of what is known as the ortho effect. Also, as is well known, the presence of the nitro group in the aryl nucleus reduces the activity of the compound.

The unsaturated alkyd resins are concerned more particularly with condensation products of polyhydric alcohols containing two or more hydroxy groups such as ethylene glycol, diethylene glycol, glycerine, etc., and an alpha-beta unsaturated polycarboxylic acid (or anhydride) such as maleic, fumaric, aconitic, tartaric, or itaconic acids. The unsaturated resins may be modified so that saturated polybasic acids may be part of the polyester molecule. Also, drying oils, saturated or unsaturated monocarboxylic acids or alcohols may be part of the polyester molecule. Solutions of these modified or unmodified polyesters in at least one other unsymmetrical organic compound copolymerizable therewith and containing the structure

are readily copolymerized in the presence of small quantities of phosphines and organic peroxides. For example, vinyl and acrylic monomers such as styrene, vinyl acetate, acrylonitrile, methylmethacrylate and the alkyl acrylates, readily copolymerize with the unsaturated alkyd resins to give hard, transparent, light-colored solids which are insoluble and infusible.

Although it is known that either the condensed unsaturated alkyd compounds or the ethylenic compounds can be polymerized by themselves under suitable conditions of heat, pressure, etc., the two types of compounds act on each other when mixed to produce a solid copolymer at a much faster rate and without the application of extraneous heat when catalyzed according to the present invention. The relative amounts of the condensed alkyd compounds and the monomeric ethylenic compounds which may be employed varies within wide limits depending upon the conditions under which it is desired to conduct the copolymerization process. Although it is preferred to conduct the copolymerization without the application of extraneous heat it is also within the scope of the invention to increase the reaction rate still more by the application of heat. It is also within the scope of the invention to carry out the reaction while positively cooling the reacting mix. For example, where a low boiling monomeric ethylenic compound is employed the composition may be cooled until the reaction has proceeded to such a stage that danger of volatilization of the monomer is passed. In general, it may be stated that when the reaction is conducted without the application of extraneous heat about 5 to 95% of the total active polymerizing composition may be either the monomeric ethylenic compound or the condensed alkyd compound. It is understood of course that solid filling materials may be added to any of the compositions of the present invention. However, the addition of volatile materials which are unpolymerizable under the conditions of the reaction is preferably avoided.

In carrying out the polymerization process, I prefer to prepare liquid resins or resin forming material (substantially undiluted by inert volatile solvents) so that the phosphines can be readily incorporated prior to the polymerization reaction. In order that the liquid resins or resin forming materials may have a reasonable storage life of from six months to one year, small amounts of inhibitor varying from 0.001% to 0.05% of hydroquinone may be added. When one is ready to prepare the final resin product a peroxide catalyst such as benzoyl peroxide may be incorporated. Prior to the polymerization reaction the phosphine is added either alone or in a dilute solution of an inert high boiling solvent such as dibutyl phthalate. Depending upon the conditions of the reaction the liquid resin soon changes to a gel with only a slight exothermic reaction. This is followed by a gradual rise in temperature and during the height of the polymerization reaction considerable heat is generated. The rate of polymerization can be controlled to a considerable extent by varying the concentrations of the organic peroxides and the phosphine added. When low concentrations of catalysts and accelerators are added the heat of the polymerization reaction is dispersed over a longer period of time resulting in light colored polymers free of bubbles and fractures.

Materials as described above are generally polymerized in the presence of benzoyl peroxide or other organic peroxides as catalysts. Examples of such other organic peroxides are lauryl peroxide, diacetyl peroxide and acetyl benzoyl peroxide. The quantity of such peroxide is preferably between 0.05 and 5% by weight of the polymerizable material.

The following will serve as examples to illustrate the accelerating effect of the phosphines and the manner in which they are incorporated into the resin solutions. But it is to be understood that these examples are set forth merely for illustrative purposes and that many other phosphines are to be considered within the confines of the present invention.

*Example 1*

A polymeric glycol maleate was prepared by heating together 1272 parts of diethylene glycol with 1186 parts of maleic anhydride in an atmosphere of $CO_2$ for eight hours at an average temperature of 205° C. A light yellow, soluble, sticky resin was obtained.

To sixty parts by weight of diethylene glycol maleate were added 10 parts of methylmethacrylate monomer, and thirty parts of styrene monomer to give a clear, light colored, fluid resin solution. One hundredth of one per cent of hydroquinone was added to this solution to prevent premature gelation when in storage.

When 3–10 parts of dimethyl phenyl phosphine, as a 10% solution in dibutyl phthalate, was added at room temperature to two thousand parts of the above liquid resin solution containing 0.5% of benzoyl peroxide, gelation resulted within seven minutes, followed by complete polymerization to a hard, fracture free solid within thirty minutes.

*Example 2*

A polyester of maleic anhydride and glycerol modified with tetrahydrofurfuryl alcohol was prepared by heating 294 parts of maleic anhydride with 138 parts of glycerol for 32 minutes at 180° C. in an atmosphere of $CO_2$ until a product having an acid number of 300 was obtained. 306 parts of tetrahydrofurfuryl alcohol was added and the mass heated at 155° C. to 200° C. in 1½ hours: and at 200° C. to 230° C. for an additional 2¼ hours. The resulting esterification was an amber resinous syrup having an acid number of 50.

A liquid resin composition was prepared by mixing 70 parts of the above polyester with thirty parts of styrene monomer. Two hundredths per cent by weight of hydroquinone was added as an inhibitor to prevent premature gelation in storage.

One per cent by weight of benzoyl peroxide was added to this resin solution. Three to ten parts of dibutyl phosphine were added to 200 parts of this composition and the polymerization was allowed to proceed at room temperature.

The composition of the present invention is particularly useful in the low pressure or contact molding process and in the production of solid bodies by casting processes. There is no volatile solvent to be eliminated and virtually all the liquid present is solidified. Whatever inert solvent is present acts as a plasticizer and does not substantially impair the strength or appearance of the finished product. Preferably the polymerization and forming processes are carried out simultaneously (see Example 6, for example) according to the present invention. The composition may be placed in a mold and polymerized and hardened to final form at atmospheric pressure or above and without supplying any extraneous heat. Since high pressures are not necessary the cost of molds is considerably reduced and speed at which the polymerization proceeds with the addition of the catalysts of the present invention permits a reduction of the time in the molds and thus less floor space is required.

Although the examples show that the polymerizing process can be carried out in the absence of extraneous heat, heat can be applied if desired and when heat is applied the reaction rate is accelerated. With the catalysts of this invention it is also possible to carry out the polymerization reaction while cooling the reaction mix depending upon the boiling points or volatility of the monomeric compound.

As a practical matter an inhibitor such as hydroquinone (as disclosed in the examples) is preferably added to the condensed alkyd resin ethylenic monomer mix to prevent premature gelation. The polymerization reaction might possibly proceed in the absence of the promoter if no inhibitor were present. However, it is desirable to control the reaction by adding the inhibitor. Examples of other inhibitors which may be employed are alphanaphthol, tannic acid, benzaldehyde, etc.

Although certain specific embodiments of this invention have been shown and described, it will be understood that many modifications thereof are possible. This invention, therefore, is not to be restricted except insofar as is necessitated by the prior art and by the spirit of the appended claims.

I claim:

1. In a method of controlling the gelation and polymerization of a polymerizable mix comprising a liquid polyhydric alcohol ester of an alpha-olefinic dicarboxylic acid and a liquid monomeric, unsaturated, unsymmetrical polymerizable compound in which the unsaturation is due to a single terminal ethylenic group, and in which the ester is soluble, and with which ester it is copolymerizable in the presence of a peroxy catalyst, said catalyst also being present, that improvement which comprises the step of conducting the polymerization in the presence of 0.001–10% calculated on the weight of the finished polymer of an organic phosphine and an organic peroxide, said organic phosphine having the general formula

where R is a radical of the class consisting of alkyl radicals and aryl radicals which contain no substituents in the ortho position with respect to the phosphorous atom and $R_1$ and $R_2$ are radicals of the class consisting of hydrogen and alkyl radicals.

2. In a method of controlling the gelation and polymerization of a polymerizable mix comprising a liquid polyhydric alcohol ester of an alpha-olefinic dicarboxylic acid and a liquid monomeric, unsaturated, unsymmetrical polymerizable compound in which the unsaturation is due to a single terminal ethylenic group, and in which the ester is soluble, and with which ester it is copolymerizable in the presence of a peroxy catalyst, said catalyst also being present, that improvement which comprises the step of conducting the polymerization in the presence of 0.001–10% calculated on the weight of the finished polymer of a trialkyl phosphine and an organic peroxide.

3. In a method of controlling the gelation and polymerization of a polymerizable mix comprising a liquid polyhydric alcohol ester of an alpha-olefinic dicarboxylic acid and a liquid monomeric, unsaturated, unsymmetrical polymerizable compound in which the unsaturation is due to a single terminal ethylenic group, and in which the ester is soluble, and with which ester it is copolymerizable in the presence of a peroxy catalyst, said catalyst also being present, that improvement which comprises the step of conducting the polymerization in the presence of 0.001–10% calculated on the weight of the finished polymer of tributyl phosphine and an organic peroxide.

4. In a method of controlling the gelation and polymerization of a polymerizable mix comprising a liquid polyhydric alcohol ester of an alpha-olefinic dicarboxylic acid and a liquid monomeric, unsaturated, unsymmetrical polymerizable compound in which the unsaturation is due to a single terminal ethylenic group, and in which the ester is soluble, and with which ester it is copolymerizable in the presence of a peroxy catalyst, said catalyst also being present, that improvement which comprises the step of conducting the polymerization in the presence of 0.001–10% calculated on the weight of the finished polymer of a secondary dialkyl phosphine and an organic peroxide.

5. In a method of controlling the gelation and polymerization of a polymerizable mix comprising a liquid polyhydric alcohol ester of an alpha-olefinic dicarboxylic acid and a liquid monomeric, unsaturated, unsymmetrical polymerizable compound in which the unsaturation is due to a single terminal ethylenic group, and in which the ester is soluble, and with which ester it is copolymerizable in the presence of a peroxy catalyst, said catalyst also being present, that improvement which comprises the step of conducting the polymerization in the presence of 0.001–10% calculated on the weight of the finished polymer of a dialkyl aryl tertiary phosphine, the aryl radical of which contains no substituent in the ortho position with respect to the phosphorous atom and an organic peroxide.

6. In a method of controlling the gelation and polymerization of a polymerizable mix comprising a liquid polyhydric alcohol ester of an alpha-olefinic dicarboxylic acid and a liquid monomeric, unsaturated, unsymmetrical polymerizable compound in which the unsaturation is due to a single terminal ethylenic group, and in which the ester is soluble, and with which ester it is copolymerizable in the presence of a peroxy catalyst, said catalyst also being present, that improvement which comprises the step of conducting the polymerization in the presence of 0.001–10% calculated on the weight of the finished polymer of dimethyl phenyl phosphine and an organic peroxide.

7. In a method of controlling the gelation and polymerization of a polymerizable mix comprising a liquid polyhydric alcohol ester of an alpha-olefinic dicarboxylic acid and a liquid monomeric, unsaturated, unsymmetrical polymerizable compound in which the unsaturation is due to a single terminal ethylenic group, and in which the ester is soluble, and with which ester it is copolymerizable in the presence of a peroxy polymerization catalyst, said catalyst also being present, that improvement which consists in the step of adding a small but effective amount of an organic phosphine having the general formula

where R is a radical of the class consisting of alkyl radicals and aryl radicals which contain no substituents in the ortho position with respect to the phosphorous atom and $R_1$ and $R_2$ are radicals of the class consisting of hydrogen and alkyl radicals.

MAX M. LEE.

No references cited.